United States Patent Office 2,827,121
Patented Mar. 18, 1958

2,827,121

HYDRAULIC FRACTURING AND SELECTIVE PLUGGING OF SUBTERRANEAN FORMATIONS

Theodore J. Nowak, Fullerton, Calif., assignor to Union Oil Company of California, Los Angeles, Calif., a corporation of California No Drawing. Application August 9, 1954
Serial No. 448,771

17 Claims. (Cl. 166—22)

This invention relates to an improved method for increasing the productivity of oil wells, and in particular concerns a method for simultaneously fracturing an oil-producing formation by hydraulic means and selectively plugging water- or brine-producing formations adjacent thereto or intermingled therewith.

Within recent years the so-called "Hydrafrac" and similar hydraulic fracturing processes for increasing the productivity of oil wells have achieved commercial importance. In general, such processes consist in forcing a viscous or "low-penetrating" fluid, e. g. gelled gasoline, into the producing formation under sufficient force to overcome the overburden pressure and produce fractures within the formation. The low-penetrating fluid which has been so forced into the formation and which fills the induced fractures is then treated in one way or another, e. g., with peptizing agents, to reduce its viscosity and allow it to be withdrawn from the formation and out of the borehole as a relatively thin liquid. In order to keep the fractures open after the pressure has been released and the fracturing fluid has been withdrawn, finely-divided insoluble solids are suspended in the low-penetrating fluid to act as a propping agent. Such solids are carried into the fractures by the fluid and when the latter is reduced in viscosity and withdrawn they are deposited within the fractures and act as props to keep the fractures open after the pressure is released.

While hydraulic fracturing has met with considerable success in mid-continent fields, it has not been employed to any substantial extent in fields such as those in Southern California where the oil-bearing strata lie closely adjacent to, or are intermingled with, water-bearing strata. In such areas it is not uncommon for well effluents to comprise as much as 90 percent of water or brine and only 10 percent of petroleum. The reason why hydraulic fracturing has not proved particularly successful in such areas is not known with certainty, but undoubtedly is in part related to the essentially aqueous nature of the formation fluids and to the geological characteristics of the water-bearing strata. Furthermore, even where hydraulic fracturing has succeeded in effecting an increase in the over-all productivity of the well, the production of water or brine has been increased to the same or even greater extent as the production of oil so that the water-to-oil ratio of the well effluent is not materially reduced and may even be increased.

It is accordingly an object of the present invention to provide a hydraulic fracturing process which is particularly adapted to use in areas where the oil-bearing strata lie closely adjacent to, or are intermingled with, water-bearing strata.

Another object is to provide a method for hydraulically fracturing subterranean formations penetrated by a well bore and simultaneously selectively plugging water-bearing strata closely adjacent to, or comprising, such formations.

A further object is to provide a combination hydraulic fracturing and selective plugging process in which the fracturing fluid is a selective plugging composition.

Other and related objects will be apparent from the following description of the invention, and various advantages not specifically referred to herein will occur to those skilled in the art upon employment of the invention in practice.

I have now found that the above objects and related advantages may be realized through the use of certain resin-forming liquids as the viscous low-penetrating fracturing fluid. More particularly, I have found that liquid compositions which condense to form water-insoluble oil-soluble resinous condensation products upon exposure to well bore temperatures can be provided in a form having viscosity and other characteristics rendering them suitable for use as hydraulic fracturing fluids. In accordance with the invention such liquid, containing a suspended propping agent if desired, is forced into the formation under a pressure in excess of the over-burden pressure so as to fracture the water- and oil-bearing strata of the formation alike. The fluid is allowed to remain within the induced fractures under pressure for a period of time sufficient for the condensation reaction to occur and thereby form a homogeneous solid resinous condensation product therein. Upon releasing the pressure and placing the well back in production such solid product will be dissolved or dispersed by the oil flowing through the fractures induced in the oil-bearing strata. However, since the solid is insoluble in water it will remain in the fractures induced in the water-bearing strata, thereby achieving the desired selective plugging. As a consequence, the production of oil from the well is greatly increased by reason of the fractures induced in the oil-bearing strata but the production of water from the well is greatly decreased by reason of the fact that the water-bearing strata and the fractures induced therein are plugged by a water-insoluble solid. Such result is attained by a single well treating operation employing relatively simple and inexpensive techniques and materials. Also, use of the present novel fracturing fluid eliminates the use of special viscosity reducing agents or gel breakers for removing the fracturing fluid from the fractured formation.

The invention thus consists essentially in fracturing subterranean water- and oil-producing formations penetrated by a well bore with a viscous fracturing fluid which is capable of undergoing chemical reaction at the formation temperature to form an oil-soluble water-insoluble resinous solid, allowing said reaction to occur within the fractures and thereafter placing the well in production, to achieve increased oil production and a decreased water-to-oil ratio in the well effluent.

The preferred combination fracturing fluid and plugging agent consists essentially of a partially condensed mixture comprising an oil-soluble phenol, paraldehyde, and an oil-soluble acidic condensation catalyst. The phenols which may be so employed are alkylated phenols in which one or more alkyl groups are substituted on the aromatic ring and such alkyl substituents contain a total of at least 2, and preferably at least 5 carbon atoms. Preferably, a majority of the alkyl groups occupy positions ortho or para to the hydroxyl group. Examples of such phenols include 2-ethyl phenol, 4-isopropyl phenol, 2-tert-butyl phenol, 4-tert-butyl phenol, 2-tert-amyl phenol, the 4-hexyl phenols, the 4-octyl phenols, 2-lauryl phenol, 2-cetyl phenol, 2,3-xylenol, 2,5-xylenol, 2,3-di-tert-butyl phenol, 2-methyl-3-ethyl phenol, 2-methyl-5-tert-butyl phenol, the 2,3-dioctyl phenols, 2,3-dilauryl phenol, alkylated naphthols, etc. Mixed phenols of this type may also be employed, as may the complex phenolic mixtures obtained by the hydrogenation of coal. One of such mixtures which has been found particularly wellsuited for the present purpose, particularly when employed in combination with the simple alkylated phenols, is a product sold by Carbide and Carbon Chemicals Corp. under the name "High-Boiling Phenols," which product is a phenolic mixture comprising meta-dialkyl phenols and indanols and has a boiling range of about 240°–270° C. While phenol itself and the cresols are inoperable in themselves since they and the resins formed therefrom are not oil-soluble, these materials may be used to replace part of the alkylated phenol component of the composition. Thus the phenolic component of the resin-forming liquid may comprise up to about 25 percent by weight of phenol or cresol with the remainder being an oil-soluble alkylated phenol as defined above. It is desirable that the composition be a homogeneous liquid, particularly in the partially condensed state, but phenolic materials which are normally solid often become liquid upon admixture with other phenols. Thus, 4-octyl phenol will ordinarily separate out of the composition to some extent at temperatures below about 135° C., but if it is employed in combination with the aforesaid "High-Boiling Phenols" the composition will remain a homogeneous liquid down to 15° C. or below.

The paraldehyde component of the preferred composition is the ordinary polymerized acetaldehyde (trimethyltrioxane) of commerce. Formaldehyde, which has previously been employed with phenols to form resin-forming liquid compositions, is inoperable in that it condenses with the present class of phenols to form resins which are only partially oil-soluble and are lacking in homogeneity.

The oil-soluble acids which are employed in the preferred composition to catalyze the phenol-aldehyde condensation reaction are preferably oil-soluble petroleum sulfonic acids, e. g., mahogany acids, obtained as by-products in the extraction of petroleum fractions with sulfuric acid. Other sulfonic acids, e. g., benzene sulfonic acid, toluene sulfonic acid, dodecylbenzene sulfonic acid, etc. may be employed, as well as the alkyl-substituted phosphoric acids such as lauryl phosphoric acid. Ordinary mineral acids such as sulfuric and hydrochloric acids and the common carboxylic acids, e. g., acetic and maleic acids, are not oil-soluble and do not promote the formation of the desired oil-soluble resins.

The proportions in which the phenolic material and paraldehyde are employed may be varied between about 0.5 and about 1.5 moles of paraldehyde per mole of phenol. The optimum proportions within this range will depend upon the identity of the phenol and the properties desired in the composition, e. g., the rapidity at which it condenses to form a solid. The oil-soluble acidic condensation catalyst is employed in an amount representing between about 0.1 and about 5 percent by weight of the entire composition, depending upon the identity of the catalyst and the phenol and the relative proportions of the phenol and the paraldehyde. Usually, the sulfonic acid catalysts are effective in smaller amounts than the carboxylic acid catalysts.

As previously stated, these resin-forming compositions are employed in a partially condensed state. The extent of condensation should be such that the viscosity of the composition is within the range required for satisfactory fracturing. Usually, such viscosity is between about 30 and about 5000 centipoises Stormer at 600 R. P. M., and is preferably between about 75 and about 500 centipoises. The partial condensation reaction is conveniently carried out simply by heating the composition at a moderate temperature, e. g., 100°–180° F., until the desired viscosity is attained. For example, when a mixture comprising equimolar proportions of 4-octyl phenol and paraldehyde and about 4 percent by weight of benzenesulfonic acid is heated at 160° F. for about ½ hour its viscosity increases from an initial value of about 15 centipoises to about 150 cps. Upon cooling to atmospheric temperatures the condensation reaction is arrested, and the partially condensed product may be stored for several days without appreciably increasing in viscosity. However, when it is again subjected to temperatures of about 100°–220° F., which commonly prevail in subterranean formations, it will further condense to form a hard oil-soluble water-insoluble resinous solid.

In accordance with conventional hydraulic fracturing practice, a propping agent is usually incorporated in the fracturing fluid for the purpose previously mentioned. Such agent is conveniently 20–30 mesh sand, and is employed in amounts ranging from 0.05 to 10 lbs./gal. of the fracturing fluid. Other inert insoluble granular solids may be employed if desired.

The following examples will illustrate the formulation and properties of several of the combination fracturing and plugging compositions of the preferred class, but are not to be construed as limiting the invention:

*Example I*

| | Pts. by wt. |
|---|---|
| 4-octyl phenol | 70 |
| Mixed cresols | 30 |
| Paraldehyde | 40 |
| Dodecylbenzene sulfonic acid | 5 |

Upon heating the composition at 160° F. for 2 hours, its viscosity increased to a value satisfactory for hydraulic fracturing purposes. After heating for an additional 70 hours, the composition was a hard resinous solid completely soluble in kerosene and insoluble in water and brine.

*Example II*

| | Pts. by wt. |
|---|---|
| "High-Boiling Phenols" | 60 |
| 4-octyl phenol | 10 |
| Paraldehyde | 30 |
| Petroleum sulfonic acid | 10 |

Upon heating at 160° F. for ½ hour, the composition has a viscosity of about 400 cps. at room temperature. Approximately 3 parts of 20–30 mesh Ottawa sand was then suspended in the composition to serve as a propping agent. Upon further heating for a total of 24 hours, the composition formed a hard resinous solid. Except for the sand, it was entirely soluble in kerosene and insoluble in water and brine.

*Example III*

| | Pts. by wt. |
|---|---|
| 4-octyl phenol | 200 |
| Paraldehyde | 44 |
| Petroleum sulfonic acid | 10 |

This composition was forced through two core samples, one of which was saturated with brine and the other saturated with kerosene. The pressure employed was less than that required to fracture the core. The two cores were then held at 160° F. for 48 hours, after which brine was backflowed through the first core and oil through the second employing a differential backflow pressure of 600 p. s. i. After such treatment the permeability of the brine-saturated core was only about 0.034% of its original value, whereas the permeability of the oil-saturated core was about 108% of its original value.

The operational and manipulation techniques employed in forcing the fracturing fluid into the formation are essentially the same as those heretofore employed. The formation to be treated is isolated by means of packers inserted in the bore and/or the well casing, and the viscous resin-forming liquid which constitutes the fracturing fluid is introduced into the bore, usually via the well tubing. The fracturing fluid is followed up by a charge of drilling mud or other suitable fluid, which follow-up fluid is continuously pumped down the tubing until the overburden pressure is exceeded and fracture occurs. The latter is indicated by a sudden decrease in the pump pressure. Further pumping forces the fracturing fluid further into the fractured formation and lengthens the fractures. In a typical operation, the pressure required to force the fluid down the tubing may rise rapidly to, say, 2500 p. s. i. over a period of 5–10 minutes, level off at this value for 30 minutes while the fracturing fluid is being forced into the formation, rise rapidly to, say, 3400 p. s. i. over a period of 2–5 minutes, and then decline more or less rapidly to, say, 2000 p. s. i. and remain at such value while the fracture is being extended. The required rate of pumping and amount of fracturing fluid can be calculated from the well depth, the viscosity of the fracturing fluid, the formation thickness and permeability, and the overburden pressure. When the optimum quantity of the fracturing fluid has been forced into the fractured formation, the well is shut in under pressure for a length of time sufficient for the fluid to undergo complete condensation and form a resinous solid within the formation. Such time depends primarily upon the temperature of the formation, and can be controlled by varying the identity and relative amounts of the components of the fracturing fluid, particularly the acid catalyst. Usually it is desirable that the condensation reaction be completed in from about 4 to about 48 hours, depending upon the depth and thickness of the formation being treated and the physical and chemical characteristics of the same. Upon completion of the condensation reaction within the fractured formation, the pressure is released and the follow-up fluid is pumped from the well, and the well is put back into production. Since the resin which has been formed within the fractured formation is highly oil-soluble it will be dissolved or dispersed by the flow of oil through the fractured oil-bearing strata but will remain within the fractured water-bearing strata by reason of its water insolubility, thereby achieving the desired selective plugging of the water-bearing strata. If desired, the treatment may be repeated one or more times, with or without extended intervening production periods. Thus, an initial fracturing operation may be carried out in the conventional manner, after which any excess of the resin-forming fracturing fluid is removed from the bore hole and the well is maintained under pressure until the liquid contained in the fractures condenses to form a solid resin. Before placing the well on production, a second fracturing operation is carried out with a second charge of fracturing fluid. Since the first set of fractures has previously been plugged with the solid resin, the second charge of fracturing fluid will not enter such fractures, but will effect the formation of a second set of fractures. The second charge is held in place until resinification occurs, after which the well is placed in production in the usual manner. As will be seen, such technique results in the formation of multiple fractures, and any number of fracturing operations can be carried out without intervening production periods to form any desired number of fractures. This manner of forming multiple fractures is considerably simpler and more direct than the means heretofore proposed for such purpose, and is of course applicable regardless of whether the formation being treated comprises water-bearing strata or not.

In general, any of the variously known hydraulic fracturing techniques may be applied to the practice of the present invention. Essentially, the invention consists in subjecting subterranean formations comprising water- and oil-bearing strata to hydraulic fracturing with a viscous fluid which is capable of forming an oil-soluble water-insoluble solid mass upon standing under the conditions of temperature and pressure prevailing in said formation, rather than in the use of any particular means or manner of effecting the fracturing operation itself. While the invention has been herein described with respect to the use of a particular preferred fracturing fluid, it will be apparent that other fluids having the stated requisite characteristics may be employed without departing from the scope of the invention. Such fluids may form solids by reason of reaction occurring between different components thereof or by reaction occurring inter se, e. g., polymerization.

Other modes of applying the principles of my invention may be employed instead of those explained, change being made as regards the materials or methods employed, provided the step or steps stated by any of the following claims, or the equivalent of such stated step or steps, be employed.

I, therefore, particularly point out and distinctly claim as my invention:

1. The method of increasing the productivity of an oil-bearing formation penetrated by a well bore which comprises introducing into said bore a viscous fracturing fluid which is capable of undergoing reaction at the temperature of said formation to form an oil-soluble water-insoluble and water-impermeable solid mass of substantially the same volume as said fluid, applying sufficient pressure on said fluid to force it into said formation and produce a fracture therein, forming said oil-soluble water-insoluble water-impermeable solid mass within said fracture by maintaining said fluid within said fracture for a period of time sufficient for said reaction to occur, and thereafter placing the well on production.

2. The method of increasing the productivity of an oil-bearing formation penetrated by a well bore which comprises introducing into said well bore a viscous fracturing fluid which is capable of undergoing reaction at the temperature of the formation to form an oil-soluble and water-impermeable solid mass of substantially the same volume as said fluid, said fluid comprising a partially condensed mixture of an oil-soluble phenol, paraldehyde, and an oil-soluble acidic condensation catalyst; applying sufficient pressure on said fluid to force it into said formation and produce a fracture therein; maintaining said fluid within said fracture until said reaction takes place, whereby said solid mass is formed within said fracture as a water-insoluble and water-impermeable solid plug; and thereafter placing the well on production.

3. The method of claim 2 wherein the said oil-soluble phenol is an alkylated phenol containing a total of at least 5 side-chain carbon atoms.

4. The method of claim 2 wherein the said condensation catalyst is an oil-soluble sulfonic acid.

5. The method of claim 2 wherein the said partially condensed mixture contains between about 0.5 and about 1.5 moles of paraldehyde per mole of the said oil-soluble phenol.

6. The method of claim 2 wherein the said partially condensed mixture contains between about 0.1 and about 5 percent by weight of the said catalyst.

7. The method of claim 2 wherein the said partially condensed mixture contains a finely-divided inert solid propping agent.

8. The method of increasing the oil productivity of a subterranean formation penetrated by a well bore and comprising both oil-bearing and water-bearing strata which comprises introducing into said bore a fluid fracturing medium having a viscosity between about 30 and about 5000 cps. Stormer and being capable of undergoing reaction at the temperature of said formation to form an oil-soluble water-insoluble and water-impermeable resinous solid mass of substantially the same volume as said fluid, applying sufficient pressure to said fluid to force it into said strata and produce fractures therein, forming said oil-soluble water-insoluble water-impermeable resinous solid mass within said fractures by maintaining sufficient pressure within the bore to hold said fluid within said fractures for a period of time sufficient for said reaction to occur, and thereafter releasing the pressure and placing the well on production.

9. The method of increasing the oil productivity of a subterranean formation penetrated by a well bore and comprising both oil-bearing and water-bearing strata which comprises introducing into said bore a fluid fracturing medium having a viscosity between about 30 and about 5000 cps. Stormer and being capable of undergoing reaction at the temperature of said formation to form an oil-soluble water-insoluble and water-impermeable resinous solid mass of substantially the same volume as said fluid, said fluid comprising an oil-soluble phenol, paraldehyde and an oil-soluble phenolaldehyde condensation catalyst; applying sufficient pressure to said fluid to force it into said stata and produce fractures therein; maintaining sufficient pressure within the bore to hold said fluid within said fractures until said reaction takes place, whereby said solid mass is formed within said fractures as a water-soluble and water-impermeable plug; and thereafter releasing the pressure and placing the well on production.

10. The method of claim 9 wherein the said fluid comprises a finely-divided inert solid propping agent.

11. The method of claim 9 wherein the oil-soluble phenol is an alkylated phenol containing a total of at least 5 side-chain carbon atoms.

12. The method of claim 9 wherein the oil-soluble phenol is a mixture comprising meta-dialkylphenols and indanols obtained by the hydrogenation of coal and having a boiling range of about 240°–270° C.

13. The method of claim 9 wherein the said catalyst is an oil-soluble sulfonic acid.

14. The method of claim 11 wherein the said mixture contains between about 0.5 and about 1.5 moles of paraldehyde per mole of alkylated phenol and, as the said catalyst, between about 0.1 and about 5 percent by weight of an oil-soluble sulfonic acid.

15. The method of producing multiple fractures in a subterranean oil-bearing formation penetrated by a well bore which comprises introducing into said bore a viscous fracturing fluid which is capable of undergoing reaction at the temperature of said formation to form an oil-soluble water-insoluble and water-impermeable solid mass of substantially the same volume as said fluid, applying to said fracturing fluid a pressure in excess of the overburden pressure on said formation to produce fractures in said formation, removing any of said fluid which remains in the bore hole without withdrawing said fluid from said fractures, forming said oil-soluble water-insoluble water-impermeable mass within said fractures by holding said fluid within said fractures for a period of time sufficient for said reaction to take place, repeating the foregoing procedure at least once to form fractures different from those initially produced, and thereafter placing the well on production.

16. The method of producing multiple fractures in a subterranean oil-bearing formation penetrated by a well bore which comprises introducing into said bore a viscous fracturing fluid which is capable of undergoing reaction at the temperature of said formation to form an oil-soluble water-insoluble and water-impermeable solid mass of substantially the same volume as said fluid, said fluid comprising an oil-soluble phenol, paraldehyde and an oil-soluble phenolaldehyde condensation catalyst; applying to said fracturing fluid a pressure in excess of the overburden pressure on said formation to produce fractures in said formation; removing any of said fluid which remains in the bore hole without withdrawing said fluid from said fractures; holding said fluid within said fractures for a period of time sufficient for said reaction to take place whereby said solid mass is formed within said fractures as a water-insoluble and water-impermeable solid plug; repeating the foregoing procedure at least once to form fractures different from those initially produced; and thereafter placing the well on production.

17. The method of claim 16 wherein the said oil-soluble phenol is an alkylated phenol containing at least 5 side-chain carbon atoms and the said catalyst is an oil-soluble sulfonic acid.

References Cited in the file of this patent

UNITED STATES PATENTS

| | | |
|---|---|---|
| 1,800,295 | Honel | Apr. 14, 1931 |
| 2,142,078 | Rust | Dec. 27, 1938 |
| 2,340,036 | Zimmer et al. | Jan. 25, 1944 |
| 2,366,036 | Leverett et al. | Dec. 26, 1944 |
| 2,378,817 | Wrightsman et al. | June 19, 1945 |
| 2,498,656 | De Groote et al. | Feb. 28, 1950 |
| 2,619,459 | Neff | Nov. 25, 1952 |
| 2,645,291 | Voorhees | July 14, 1953 |
| 2,664,954 | Johnson | Jan. 5, 1954 |
| 2,699,212 | Dismukes | Jan. 11, 1955 |